United States Patent
Pintauro et al.

(10) Patent No.: US 10,400,817 B2
(45) Date of Patent: Sep. 3, 2019

(54) RADIAL BEARING DEVICE

(71) Applicant: Woodward, Inc., Fort Collins, CO (US)

(72) Inventors: Arthur Pintauro, Fort Collins, CO (US); John Karspeck, Loveland, CO (US); Charles Brennecke, Fort Collins, CO (US); Taylor Ritchie, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 158 days.

(21) Appl. No.: 15/359,130

(22) Filed: Nov. 22, 2016

(65) Prior Publication Data

US 2018/0142798 A1    May 24, 2018

(51) Int. Cl.
*F16K 43/00* (2006.01)
*F16C 19/06* (2006.01)
(Continued)

(52) U.S. Cl.
CPC .............. *F16C 19/06* (2013.01); *F16C 23/08* (2013.01); *F16C 33/586* (2013.01); *F16K 1/224* (2013.01);
(Continued)

(58) Field of Classification Search
CPC ...... F16K 27/067; F16C 19/54; F16C 19/545; F16C 25/06; F16C 35/12; F16C 17/08; F16C 19/06
See application file for complete search history.

(56) References Cited

U.S. PATENT DOCUMENTS 3,056,636 A * 10/1962 Mims .................... F16C 19/54
                                                       29/404
3,622,213 A    11/1971 Onsrud
(Continued)

FOREIGN PATENT DOCUMENTS

DE          837785       5/1952
EP        0010698 B1     4/1983
(Continued)

OTHER PUBLICATIONS

International Search Report and Written Opinion in International Application No. PCT/US2017/061155, dated Jun. 8, 2018, 12 pages.

*Primary Examiner* — Reinaldo Sanchez-Medina
(74) *Attorney, Agent, or Firm* — Fish & Richardson P.C.

(57) ABSTRACT

A bearing device for supporting a shaft to rotate relative to an outer hub includes: an annular outer race mountable within an interior bore of the hub, the outer race including an inwardly facing radial groove sized to receive a rounded bearing element; and an annular inner race mountable to an outwardly curved exterior surface of the shaft. The inner race includes an outwardly facing radial groove sized to receive the bearing element, the respective radial grooves of the inner and outer races together forming an annular raceway to retain the bearing element when the bearing device is assembled. The inner race further includes an axially convex surface along an innermost diameter of the inner race, the convex surface shaped to directly engage the exterior surface of the shaft when mounted thereto, such that the inner race remains in contact with the shaft while accommodating radial deflection of the shaft.

14 Claims, 3 Drawing Sheets

(51) Int. Cl.
*F16C 23/08* (2006.01)
*F16K 1/22* (2006.01)
*F16C 33/58* (2006.01)
*F16K 5/06* (2006.01)

(52) U.S. Cl.
CPC .......... *F16K 5/0605* (2013.01); *F16K 5/0694* (2013.01); *F16C 33/585* (2013.01); *F16C 2240/30* (2013.01); *F16C 2361/91* (2013.01)

(56) References Cited

U.S. PATENT DOCUMENTS

| | | |
|---|---|---|
| 3,727,997 A | 4/1973 | Brucher et al. |
| 3,747,998 A | 7/1973 | Klein et al. |
| 3,968,699 A | 7/1976 | van Beukering |
| 4,007,975 A | 2/1977 | Schutz et al. |
| 4,037,892 A | 7/1977 | Jahn et al. |
| 4,132,503 A | 1/1979 | Kreft et al. |
| 4,202,078 A | 5/1980 | Malinak |
| 4,224,806 A | 9/1980 | Kobayashi |
| RE30,713 E | 8/1981 | Ferris et al. |
| 4,360,314 A | 11/1982 | Pennell |
| 4,522,110 A | 6/1985 | Samuelsson |
| 4,696,587 A * | 9/1987 | Nishida ............... F16C 35/067 384/536 |
| 4,755,067 A | 7/1988 | Asberg et al. |
| 4,856,468 A | 8/1989 | Speil et al. |
| 4,878,881 A | 11/1989 | Van Dest |
| 5,048,982 A | 9/1991 | Nakanishi |
| 5,176,456 A | 1/1993 | Takebayashi et al. |
| 5,348,248 A | 9/1994 | Butenop |
| 5,445,030 A | 8/1995 | Hagen |
| 5,641,235 A | 6/1997 | Maughan et al. |
| 5,725,597 A | 3/1998 | Hwang |
| 6,003,229 A | 12/1999 | Beduhn et al. |
| 6,018,503 A | 1/2000 | Pfister et al. |
| 6,050,727 A | 4/2000 | Messmer et al. |
| 6,309,109 B1 * | 10/2001 | Chuang ............... F16C 19/54 384/499 |
| 6,354,745 B1 | 3/2002 | Ai |
| 6,886,986 B1 | 5/2005 | Julien |
| 6,901,639 B2 | 6/2005 | Freiberg et al. |
| 6,945,696 B2 | 9/2005 | Dittes et al. |
| 7,150,051 B2 | 12/2006 | Schlief |
| 7,296,985 B2 | 11/2007 | Koehler |
| 7,568,409 B2 | 8/2009 | Nicholl et al. |
| 7,837,565 B2 | 11/2010 | Durre et al. |
| 8,202,003 B2 | 6/2012 | Klusman et al. |
| 8,347,683 B2 | 1/2013 | Lu |
| 8,500,336 B2 * | 8/2013 | Kouscheschi ............ C23C 2/003 384/418 |
| 8,567,358 B2 | 10/2013 | Willimczik |
| 8,727,107 B2 | 5/2014 | Formicola et al. |
| 8,758,190 B2 | 6/2014 | Montestrue |
| 9,346,057 B2 | 5/2016 | Urbinatti et al. |
| 9,841,052 B2 * | 12/2017 | Anstey .................. F16C 23/088 |
| 9,897,218 B2 * | 2/2018 | Gamache ............... F16K 5/201 |
| 2003/0101966 A1 | 6/2003 | Hattori et al. |
| 2003/0197338 A1 | 10/2003 | Chen |
| 2006/0019808 A1 | 1/2006 | Svenka et al. |
| 2007/0175011 A1 | 8/2007 | Ziesel |
| 2011/0098166 A1 | 4/2011 | Kerschbaumer et al. |
| 2012/0298900 A1 | 11/2012 | Brinks et al. |
| 2014/0252259 A1 | 9/2014 | Yokoyama et al. |
| 2014/0362242 A1 | 12/2014 | Takizawa |
| 2015/0159666 A1 | 6/2015 | McManus et al. |
| 2015/0219148 A1 | 8/2015 | Wernhoener |
| 2015/0337888 A1 | 11/2015 | Baubet et al. |
| 2016/0084316 A1 | 3/2016 | Rode |

FOREIGN PATENT DOCUMENTS

| | | |
|---|---|---|
| EP | 288489 A1 | 11/1988 |
| EP | 0368827 A1 | 5/1990 |
| EP | 608452 B1 | 10/1994 |
| EP | 514754 B1 | 7/1996 |
| EP | 1086010 A1 | 3/2001 |
| EP | 944775 B1 | 3/2003 |
| EP | 855306 B1 | 3/2004 |
| EP | 1333781 B1 | 12/2004 |
| EP | 1585417 B1 | 6/2006 |
| EP | 1300242 B1 | 9/2006 |
| EP | 1399688 B1 | 1/2008 |
| EP | 1643078 B1 | 1/2008 |
| EP | 1302622 A3 | 10/2008 |
| EP | 1676038 B1 | 12/2008 |
| EP | 1507089 B1 | 3/2009 |
| EP | 2328496 A2 | 6/2011 |
| EP | 1908972 B1 | 11/2011 |
| EP | 2398569 A1 | 12/2011 |
| EP | 2470767 A1 | 7/2012 |
| EP | 2817525 A1 | 12/2014 |
| EP | 2715164 B1 | 3/2015 |
| EP | 2936659 A1 | 10/2015 |
| EP | 2242925 B1 | 11/2015 |
| JP | H10159844 | 6/1998 |
| JP | 2000192950 | 7/2000 |
| JP | 2008196668 | 8/2008 |
| WO | WO1992021889 A1 | 12/1992 |
| WO | WO2002019501 A1 | 3/2002 |
| WO | WO2009083362 A1 | 7/2009 |
| WO | WO2009125051 A1 | 10/2009 |
| WO | WO2014164689 A3 | 11/2014 |
| WO | WO2015076850 A1 | 5/2015 |
| WO | WO2015110138 A1 | 7/2015 |
| WO | WO2015103271 A3 | 8/2015 |
| WO | WO2016051147 A1 | 4/2016 |

* cited by examiner

RADIAL BEARING DEVICE

TECHNICAL FIELD

This specification generally relates to bearing devices that withstand and accommodate high radial and torsional loads caused by angular shaft deflection.

BACKGROUND

Radial ball bearings include opposing inner and outer races that form an interior raceway for containing a complement of precision rolling balls. The balls maintain separation between the races and reduce rotational friction between them. Typically, the inner race is attached to a rotating component of the assembly (e.g., a cylindrical shaft), and the outer race is attached to a stationary component (e.g., a housing or hub containing the shaft). The bearing device mounted between these components permits relative rotation between them with low friction. Ball bearings are exceedingly versatile devices because they can be configured to bear both radial and axial loads. Yet, ball bearings tend to have lower load capacity than other types of bearings due to the smaller contact area between the balls and races, and can also be easily damaged from significant misalignment of the races. These limitations of ball bearings are further exposed when the balls are composed of a brittle material, such as a ceramic. Ceramic bearing balls, while more subject to fracture, are superior to their metallic counterparts in high temperature implementations because they are more dimensionally stable (i.e., they do not anneal or soften like metal balls). Given these conflicts in fundamental design characteristics, there is an inherent difficulty in providing bearing solutions for high temperature, low friction rotary applications involving significant angular shaft deflection.

SUMMARY

In a first aspect, a bearing device for supporting a shaft to rotate relative to an outer hub includes: an annular outer race mountable within an interior bore of the hub, the outer race including an inwardly facing radial groove sized to receive a rounded bearing element; and an annular inner race mountable to an outwardly curved exterior surface of the shaft. The inner race includes an outwardly facing radial groove sized to receive the bearing element, the respective radial grooves of the inner and outer races together forming an annular raceway to retain the bearing element when the bearing device is assembled. The inner race further includes an axially convex surface along an innermost diameter of the inner race, the convex surface shaped to directly engage the exterior surface of the shaft when mounted thereto, such that the inner race remains in contact with the shaft while simultaneously accommodating radial deflection of the shaft caused by external forces.

In some examples, the convex surface is symmetrically curved about an axial midpoint of the inner race.

In some examples, the convex surface defines a degree of curvature between about 0.5° and 5°.

In some examples, each of the outer race and the inner race includes a raised radial shoulder adjacent the respective radial grooves, the height of the shoulder of the inner race being greater than the height of the shoulder of the outer race. In some examples, a ratio of the inner race shoulder height relative to the outer race shoulder height is between about 1 and 1.5.

In some examples, the inner race includes a raised radial shoulder adjacent the outwardly facing radial groove, the radial shoulder including a filleted lip along an edge of the groove. In some examples, the filleted lip defines a degree of curvature of at least about 70°.

In a second aspect, a fluid valve includes: a valve body housing a valve element in an interior chamber between an inlet port and an outlet port, the valve element configured to regulate a flow of fluid through the valve body; a shaft operatively coupled to the valve element at one end, the shaft residing in an interior bore of a hub portion of the valve body; and a bearing device mounted radially between the shaft and the interior bore of the hub and configured to support the shaft to rotate relative to the valve body. The bearing device includes an annular outer race, an annular inner race, and a bearing element retained in a raceway formed by opposing radial grooves of the races. The inner race includes an axially convex surface along an innermost diameter of the inner race, the convex surface directly engaging an outwardly curved exterior surface of the shaft, such that the inner race remains in contact with the shaft while simultaneously accommodating radial deflection of the shaft caused by fluid pressure forces.

In some examples, the bearing device is mounted with a clearance relative to the shaft and the outer race, enabling the inner race to tilt relative to the outer race in response to radial deflection of the shaft. In some examples, the degree of relative tilt between the inner and outer races is between about 0.5° and 2.0°.

In some examples, the convex surface is symmetrically curved about an axial midpoint of the inner race.

In some examples, the convex surface defines a degree of curvature of between about 0.5° and 5.0°.

In some examples, each of the outer race and the inner race includes a raised radial shoulder bracketing the respective radial grooves, the height of the shoulder of the inner race being greater than the height of the shoulder of the outer race. In some examples, a ratio of the inner race shoulder height relative to the outer race shoulder height is between about 1.0 and 1.5.

In some examples, the inner race includes a raised radial shoulder bracketing the outwardly facing radial groove, the radial shoulder including a filleted along an edge of the groove. In some examples, the filleted lip defines a degree of curvature of at least about 70°.

In a third aspect, a bearing device for supporting a shaft to rotate relative to an outer hub includes: an annular outer race mountable within an interior bore of the hub, the outer race including an inwardly facing radial groove sized to receive a rounded bearing element; and an annular inner race mountable to an outwardly curved exterior surface of the shaft. The inner race includes an outwardly facing radial groove sized to receive the bearing element. The respective radial grooves of the inner and outer races together form an annular raceway to retain the bearing element when the bearing device is assembled. The radial grooves of the inner and outer races are bordered by respective raised radial shoulders. The height of the shoulder of the inner race is greater than the height of the shoulder of the outer race. The radial shoulder of the inner race includes a filleted along an edge of the radial groove. The inner race further includes an axially convex surface along an innermost diameter of the inner race. The convex surface is symmetrically curved about an axial midpoint of the inner race and shaped to directly engage the exterior surface of the shaft when mounted thereto, such that the inner race remains in contact with the shaft while simultaneously accommodating radial deflection of the shaft caused by external forces.

In some examples, the convex surface of the inner race defines a degree of curvature of between about 0.5° and 5.0°.

In some examples, a ratio of the inner race shoulder height relative to the outer race shoulder height is between about 1.0 and 1.5.

In some examples, the filleted lip defines a degree of curvature of at least about 70°.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Many of the features are exaggerated to better show the features, process steps, and results. Like reference numbers and designations in the various drawings indicate like elements.

DETAILED DESCRIPTION

The present disclosure is directed to bearing devices including structural features for withstanding and accommodating high radial and torsional loads caused by angular shaft deflection. In particular, one or more embodiments of the present disclosure are derived from a realization that prior difficulties in producing such bearing devices can be overcome by the combined effect of certain interrelated design elements. In some examples, such elements include: (1) a crowned inner race featuring an axially convex surface engaging the curved exterior surface of the elongated rotating shaft; (2) an enlarged shoulder height along a radial raceway groove of the inner race; and (3) an enlarged radius along a filleted lip extending along the groove. As discussed in detail below, these features in combination represent a distinct paradigm shift in the technical field that enables the use of ball bearings in applications that were previously considered impracticable. Indeed, conventional deep-groove ball bearings experiencing misalignment from shaft deflection demonstrate a tendency for the balls to rotate over the race shoulder, which causes the balls and/or the races to crack from high contact stress and shear. Embodiments of the present disclosure, however, provide features that urge the contact ellipse between the balls and the races to remain contained within the raceway, and reduce contact stress between them in the event that the balls do ride up near the shoulder of the inner race.

Figure 1:
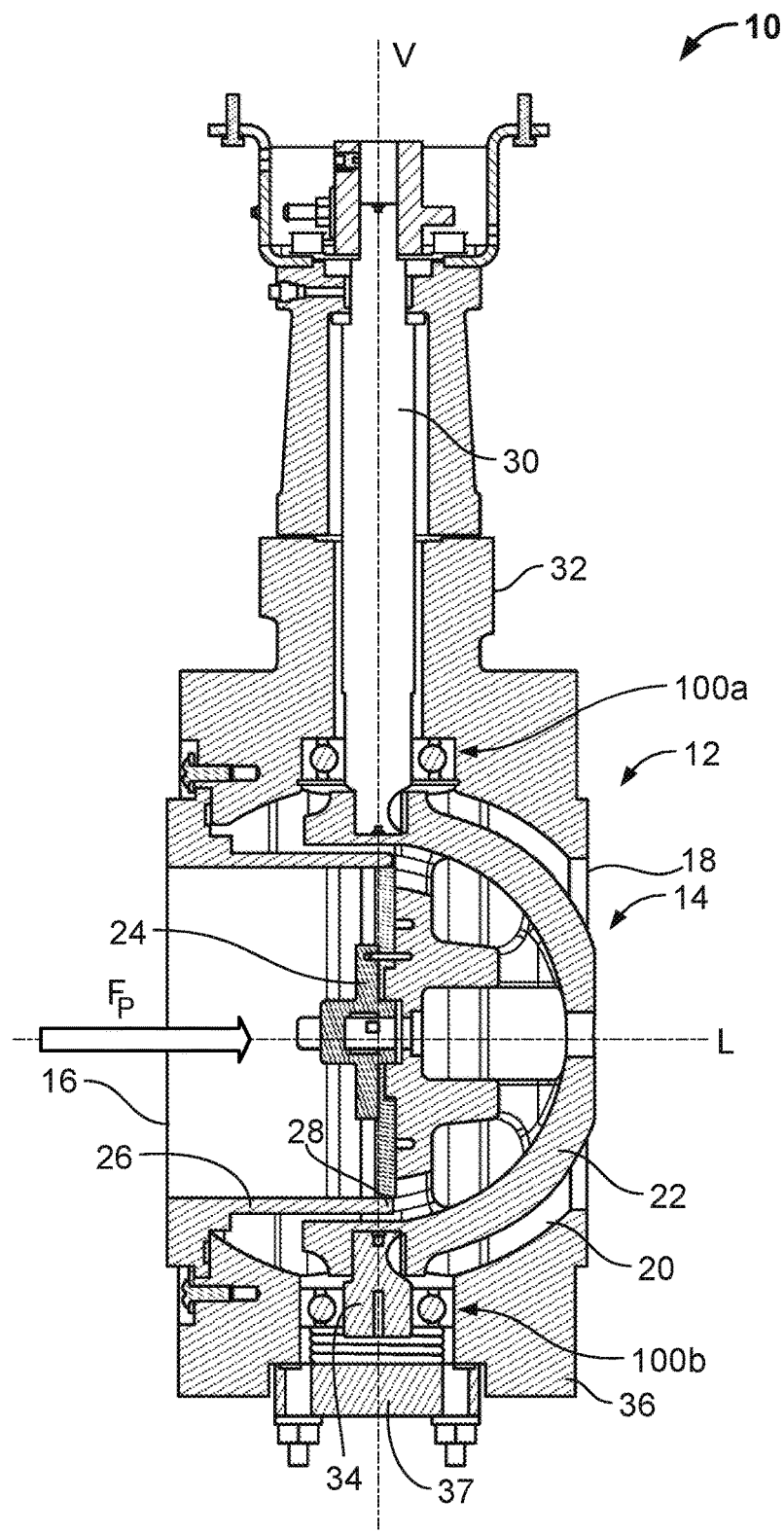
FIG. 1 is a cross-sectional side view of a fluid valve incorporating exemplary bearing devices in accordance with one or more embodiments of the present disclosure.

Referring first to the exemplary embodiment shown in FIG. 1, a fluid valve 10 includes a valve body 12 housing a valve element 14. Valve body 12 includes an inlet port 16, an outlet port 18, and a bulbous interior chamber 20 located between the two ports. These features of valve body 12 are aligned with one another along a lateral axis "L." Inlet port 16 and outlet port 18 each include a flanged pipe coupling for connecting to respective upstream and downstream pipe sections of a fluid system (not shown). When fluid valve 10 is installed at the junction between two pipe sections, fluid enters valve body 12 through inlet port 16, flows through interior chamber 20, and exits through outlet port 18.

Valve element 14 is movable relative to valve body 12, and specifically designed to regulate the flow of fluid traversing interior chamber 20 by altering the size of a flow path through the valve—i.e., the "valve area." Altering the valve area involves rotating valve element 14 in place about a vertical axis "V." For example, rotating valve element 14 in a clockwise direction may constrict the valve area and decrease the mass flow rate of fluid, while counterclockwise rotation may open the valve area to increase the fluid mass flow rate (or vice versa). In this example, valve element 14 features a hybrid butterfly and segmented ball component 22, a reinforcement disk 24, an inlet flow tube 26, and a valve seat 28. This design is particularly well-suited for fluid metering applications, providing fluid-tight shutoff ability, high flow capacity, high differential pressure capability, and ability to operate in elevated pressure and temperature ranges. However, various other types of valve elements may also be used without departing from the scope of the present disclosure.

In this example, valve element 14 is mounted on the distal end of an elongated drive shaft 30 housed in a primary stem 32 of valve body 12. Valve element 14 is operatively coupled to drive shaft 30 (e.g., via mating splines, mechanical fasteners, or other attachment techniques), such that rotation of the drive shaft effects substantially identical rotation of the valve element 14. Drive shaft 30 can be manually, hydraulically, pneumatically, or electrically actuated to operate valve element 14. An idle support shaft 34 housed in a secondary stem 36 of valve body 12 bears the weight of valve element 14 and suspends the valve element 14 in place within interior chamber 20. A base plate 37 coupled to valve body 12 locates the support shaft 34 relative to the valve element 14. Drive shaft 30 and the support shaft 34 are mounted in the respective valve-body stems 32,36 by radial bearing devices 100a,b. As discussed herein, bearing devices 100a,b are specifically configured to simultaneously withstand and accommodate high radial and torsional loads caused by angular deflection of shafts 30, 34.

Angular shaft deflection is caused by high fluid pressure forces "$F_p$" acting against valve element 14 in the direction of fluid flow leading from inlet port 16 to outlet port 18. The fluid pressure force urges valve element 14 in a direction substantially perpendicular to the coaxial drive and support shafts 30, 34. In certain industrial applications (e.g., combustion turbine fuel metering implementations), the magnitude of the fluid pressure force may exceed tens of thousands of pounds (e.g., 22,000 $lb_f$ or more). These exceedingly high forces can overwhelm the structural integrity of shafts 30, 34 and their associated mounting hardware, causing the shafts to twist or "deflect" angularly off of the vertical axis "V." Severe angular deflection of shafts 30, 34 may cause the misalignment of radial bearings 100a, 100b, which leads to a risk that the balls secured between the inner and outer races of the bearings will ride up and over the shoulder of the raceway grooves, causing irreparable damage (e.g., structural failure, such as cracking). The particular features discussed below are combined and properly balanced to mitigate this risk.

Figure 2A:
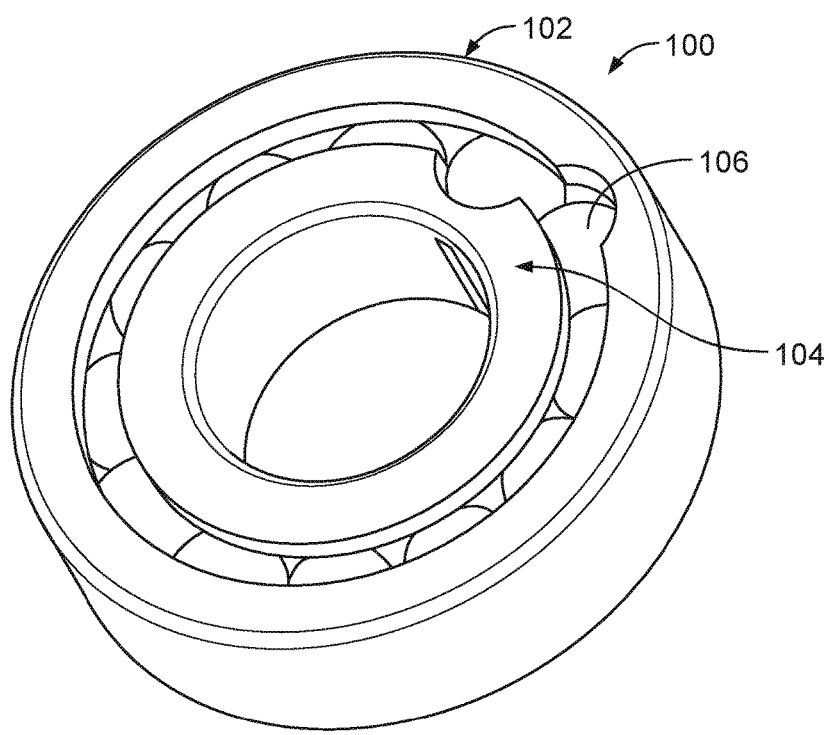
FIG. 2A is an isolated perspective view of one of the exemplary bearing devices of FIG. 1.
Figure 2B:
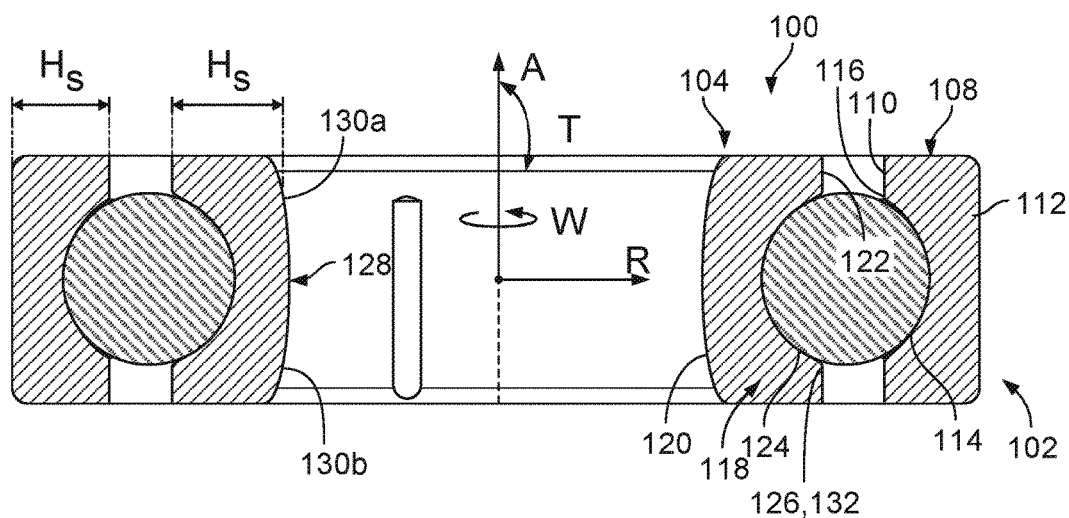
FIG. 2B is a cross-sectional side view of the exemplary bearing device of FIG. 2A taken along the line 2B-2B.
Figure 3:
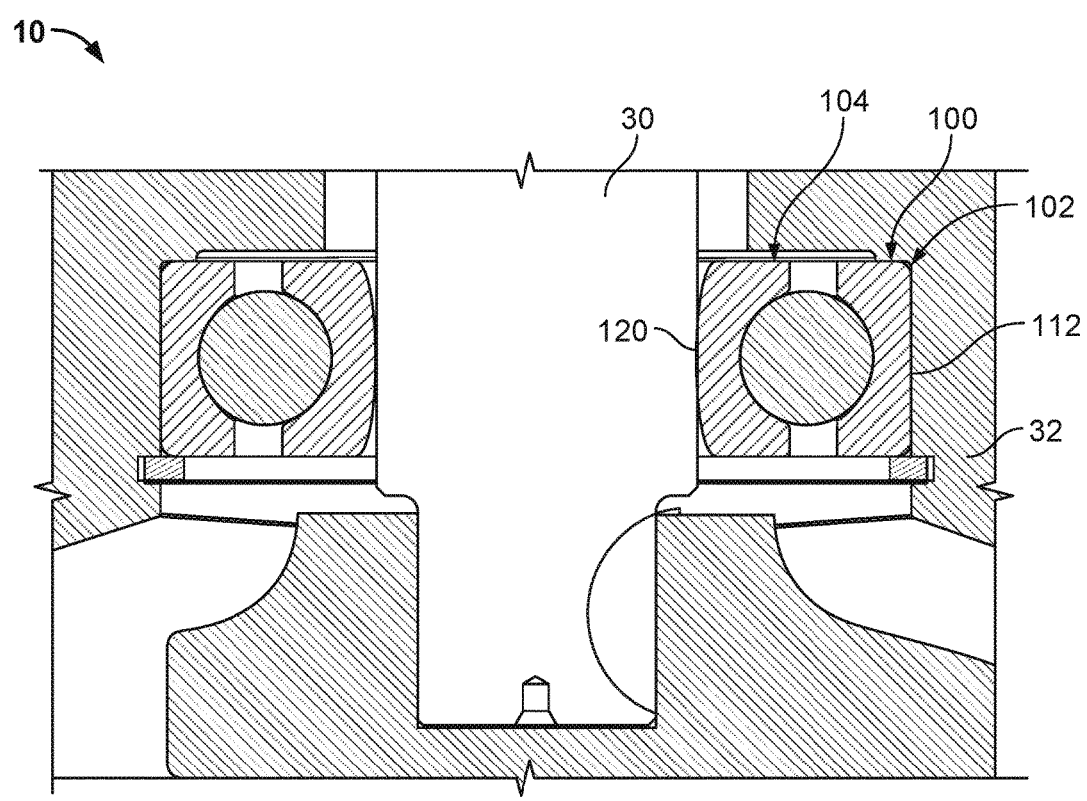
FIG. 3 is an enlarged view of a portion of FIG. 1 illustrating an exemplary bearing device installed in the fluid valve.

Referring next to FIGS. 2A, 2B and 3, radial bearing device 100 (which corresponds to either or both of bearing devices 100a,b of FIG. 1) is provided in the form of a cageless, slot-fill, single-row radial contact bearing. Accordingly, bearing device 100 includes an outer race 102, an inner race 104, and a compliment of bearing balls 106 sandwiched radially between the races. These components are described herein with reference to an axial direction "A" (which is aligned with the vertical axis "V" of FIG. 1), a radial direction "R," an angular direction of rotation "ω," and an angular direction of torsional twisting "T." The angular direction "ω" is the direction drive shaft 30 rotates to operate valve element 14. Angular direction "T" is the direction drive shaft 30 rotates when it deflects in response to overwhelming external forces. The term "inner" is used in the present disclosure with reference to a radial direction towards the axial centerline of bearing device 100. The term "outer" is used with reference to a radial direction away from the axial centerline.

As shown, outer race 102 includes an annular body 108 having an inner face 110 and an outer face 112. As shown in FIG. 3, when installed in fluid valve 10, outer face 112 is fixedly attached to the curved interior bore surface of the valve body stem (e.g., stem 32 or 36). Inner face 110 defines a groove 114 formed as a radial depression having a rounded concave surface bracketed by opposing radially raised shoulders 116. The surface of groove 114 is appropriately shaped and sized to receive bearing balls 106 with a relatively small contact area, such that the balls are allowed to rotate within the groove with very little friction. Similar to outer race 102, inner race 104 includes an annular body 118 with an inner face 120 and an outer face 122. Inner race 104 is oriented oppositely from outer race 102, thus outer face 122 defines a ball-receiving groove 124 bracketed by radially raised shoulders 126. As shown, the opposing grooves 114,124 of outer race 102 and inner race 104 cooperate to form an annular raceway that retains bearing balls 106 between the races during use. As shown in FIG. 3, when installed in fluid valve 10, inner face 120 engages the curved outer surface of the shaft (e.g., shaft 30 or 34).

Inner race 104 is appropriately configured with a variety of features that renders bearing device 100 resilient to angular shaft deflection. One such feature is the crowned inner face 120. In this example, inner face 120 has an axially convex surface that engages the exterior surface of shaft 30 (see FIG. 3). The term "axially convex," as used in the present disclosure, means that the surface is non-planar and curves inwardly towards the shaft between axial end points. As shown in FIG. 3, the axially convex surface of inner face 120 is appropriately shaped to maintain contact with shaft 30, while simultaneously accommodating angular shaft deflection. In this example, inner race 104 is keyed to shaft 30 to fix the inner race to the shaft without slipping. This coupling between inner race 104 and shaft 30 places the furthest extending portion (i.e., the "crown") 128 of inner face 120 in direct contact with the outer surface of shaft 30. The peripheral surface portions 130a,b on either side of crown 128 allow shaft 30 to move in the angular direction "T" without causing corresponding movement by inner race 104. This "angular play" between shaft 30 and inner race 104 provides a significant advantage because it effectively isolates bearing device 100 from a limited amount of torsional twisting of shaft 30, and therefore inhibits misalignment of the races that leads to various failure modes. While a similar amount of angular play can be achieved by crowning the outer surface of shaft 30, providing this feature on the bearing device is particularly advantageous because it ensures that the contact angle between outer and inner races 102,104 remains directed through the center of bearing balls 106.

In the illustrated example, the convex surface of inner face 120 is symmetrically curved, placing crown 128 at the axial midpoint of inner race 104. This symmetrical curvature profile provides equal angular play in both directions of shaft direction. However, other configurations are also contemplated by this disclosure. For example, a non-symmetrical profile may be used where shaft deflection is expected to occur in only a single direction. In some examples, the convex surface defines a degree of curvature of between about 0.5° of 5.0° (e.g., between about 1.0° and 4.0°, or between about 2.0° and 3.0°). The degree of curvature defines the amount of angular play between shaft 30 and inner race 104. The amount of angular play increases with increasing degree of curvature. There is, however, an upper limit to the degree of curvature, because at some point the narrowed crown becomes a stress concentration point that can cause structural failure of the inner race.

Because the amount of angular play provided by the crowned inner face 120 is limited, inner race 104 also includes various compensatory features to further mitigate the risk of structural failure with shaft deflection. That is, when the angular play has been expended by severe shaft deflection, the effect of the compensatory features is to lessen the likelihood of failure as the torsional twisting forces are imparted on the bearing device. One such compensatory feature of inner race 104 is axial and radial clearance, which allows inner race 104 to rotate or "tilt" in the direction "T" relative to outer race 102 in response to shaft deflection. In some examples, the degree of relative tilt between the inner and outer races is between about 0.5° and 2.0° (e.g., between about 1.0° and 1.5°, or about 1.3°). Another compensatory feature working in tandem with the axial and radial clearance is the enlargement of radial shoulders 126. Enlargement of radial shoulders 126 decreases the likelihood of structural failure (e.g., ball fracture) by placing the shoulder edge closer to the center of bearing balls 106. That is, the enlarged shoulder height renders the bearing balls more resistant to rolling up on the shoulders during severe torsional twisting (i.e., movement in direction "T").

Similar to the degree of curvature on crowned inner face 120, the extent to which the shoulder height (indicated as "$H_s$" in FIG. 2B) can be increased is also limited by other structural design and manufacturing constraints. Given the incident side effects of enlarging the radial shoulders, in some examples, this feature may only be implemented on inner race 104. Thus, the shoulder height of inner race 104 can be greater than the shoulder height of the outer race 102. In some examples, the ratio of the inner-race shoulder height relative to the outer-race shoulder height is between about 1.0 and 1.5 (e.g., between about 1.2 and 1.4, or about 1.3).

Yet another compensatory feature of inner race 104 is provided in the form of a rounded or filleted lip 132 extending along an edge of its ball-receiving groove 124. The filleted feature of lip 132 effectively reduces the contact stress on bearing balls 106 and inner race 104 in the event that the bearing balls 106 ride up along radial shoulders 126. In some examples, the filleted lip defines a degree of curvature of at least about 70.0°.

The various inner race features discussed throughout the present disclosure are specifically designed to mitigate the risk of structural failure in low-friction deep-groove angular ball bearings that are likely to endure significant shaft deflection during use. While these features may be implemented independently in certain applications, there appears to be a synergistic effect in deploying them in combination. As discussed above, the crowned inner face of the race introduces angular play between the shaft and inner race, and the axial/radial clearance, enlarged shoulder height, and filleted lip provide compensatory relief of contact stress when shaft deflection is severe enough to overwhelm the angular play. In fact, a particular configuration achieved surprisingly superior results during testing. The testing was initially performed at 900° F. with a radial load of 11,000 lb$_f$. The initial testing was followed by additional testing at 500° F. with a radial load of 22,000 lb$_f$. Each test was performed for 2,000 full open and close cycles. The design parameters for the tested bearing configuration is provided in the table below.

| Inner Race Design Feature | Value |
|---|---|
| Degree of Curvature - Inner Face | 2.2° |
| Degree of Clearance | 0.0035 inch |
| Shoulder Height Ratio | 1.165 |
| Degree of Curvature - Filleted Lip | 70.7° |

A number of embodiments of the invention have been described. Nevertheless, it will be understood that various modifications may be made without departing from the spirit and scope of the inventions.

What is claimed is:

1. A bearing device for supporting a shaft to rotate relative to an outer hub, the bearing device comprising:
    an annular outer race mountable within an interior bore of the hub, the outer race comprising an inwardly facing radial groove sized to receive a rounded bearing element; and
    an annular inner race mountable to an outwardly curved exterior surface of the shaft, the inner race comprising:
        an outwardly facing radial groove sized to receive the bearing element, the respective radial grooves of the inner and outer races together forming an annular raceway to retain the bearing element when the bearing device is assembled; and
        an axially convex surface along an innermost diameter of the inner race, the convex surface comprising a continuous surface having two peripheral surface portions on either side of a crowned surface portion, the convex surface shaped to directly engage the crowned surface portion of the inner race with the exterior surface of the shaft when mounted thereto, such that the inner race remains in contact with the shaft while simultaneously accommodating radial deflection of the shaft caused by external forces,
    wherein each of the outer race and the inner race comprises a raised radial shoulder adjacent the respective radial grooves, the height of the shoulder of the inner race in a radial direction being greater than the height of the shoulder of the outer race in the radial direction, and wherein a ratio of the inner race shoulder height relative to the outer race shoulder height is between 1 and 1.5.

2. The bearing device of claim 1, wherein the convex surface is symmetrically curved about an axial midpoint of the inner race.

3. The bearing device of claim 1, wherein the convex surface defines a degree of curvature between 0.5° and 5°.

4. The bearing device of claim 1, wherein the raised radial shoulder of the inner race comprises a filleted lip along an edge of the outwardly facing radial groove of the inner race.

5. The bearing device of claim 4, wherein the filleted lip defines a degree of curvature of at least 70°.

6. A fluid valve, comprising:
    a valve body housing a valve element in an interior chamber between an inlet port and an outlet port, the valve element configured to regulate a flow of fluid through the valve body;
    a shaft operatively coupled to the valve element at one end, the shaft residing in an interior bore of a hub portion of the valve body; and
    a bearing device mounted radially between the shaft and the interior bore of the hub and configured to support the shaft to rotate relative to the valve body, the bearing device comprising an annular outer race, an annular inner race, and the bearing element retained in a raceway formed by opposing radial grooves of the races, the inner race comprising:
        an axially convex surface along an innermost diameter of the inner race, the convex surface comprising a continuous surface having two peripheral surface portions on either side of a crowned surface portion, the crowned surface portion of the convex surface directly engaging an outwardly curved exterior surface of the shaft, such that the inner race remains in contact with the shaft while simultaneously accommodating radial deflection of the shaft caused by fluid pressure forces,
    wherein each of the outer race and the inner race comprises a raised radial shoulder bracketing the respective radial grooves, the height of the shoulder of the inner race in a radial direction being greater than the height of the shoulder of the outer race in the radial direction, and wherein a ratio of the inner race shoulder height relative to the outer race shoulder height is between 1.0 and 1.5.

7. The fluid valve of claim 6, wherein the bearing device is mounted with a clearance relative to the shaft and the outer race, enabling the inner race to tilt relative to the outer race in response to radial deflection of the shaft.

8. The fluid valve of claim 7, wherein the degree of relative tilt between the inner and outer races is between 0.5° and 2.0°.

9. The fluid valve of claim 6, wherein the convex surface is symmetrically curved an axial midpoint of the inner race.

10. The fluid valve of claim 6, wherein the convex surface defines a degree of curvature of between 0.5° and 5.0°.

11. The fluid valve of claim 6, wherein the radial shoulder of the inner race comprises a filleted lip along an edge of the groove, and wherein the filleted lip defines a degree of curvature of at least 70°.

12. A bearing device for supporting a shaft to rotate relative to an outer hub, the bearing device comprising:
    an annular outer race mountable within an interior bore of the hub, the outer race comprising an inwardly facing radial groove sized to receive a rounded bearing element; and
    an annular inner race mountable to an outwardly curved exterior surface of the shaft, the inner race comprising:
        an outwardly facing radial groove sized to receive the bearing element, the respective radial grooves of the inner and outer races together forming an annular raceway to retain the bearing element when the bearing device is assembled, the radial grooves of the inner and outer races bordered by respective raised radial shoulders, the height of the shoulder of the inner race in a radial direction being greater than the height of the shoulder of the outer race in the radial direction, and the radial shoulder of the inner race comprising a filleted along an edge of the radial groove; and an axially convex surface along an innermost diameter of the inner race, the convex surface comprising a continuous surface having two peripheral surface portions on either side of a crowned surface portion, the convex surface symmetrically curved about an axial midpoint of the inner race and shaped to directly engage the crowned surface portion of the inner race with the exterior surface of the shaft when mounted thereto, such that the inner race remains in contact with the shaft while simultaneously accommodating radial deflection of the shaft caused by external forces, wherein a ratio of the inner race shoulder height relative to the outer race shoulder height is between 1.0 and 1.5.

13. The bearing device of claim 12, wherein the convex surface of the inner race defines a degree of curvature of between 0.5° and 5.0°.

14. The bearing device of claim 12, wherein the filleted defines a degree of curvature of at least 70°.

* * * * *